C. E. MORTON.
SAFETY MECHANISM FOR MOVING PICTURE MACHINES.
APPLICATION FILED APR. 23, 1919.
1,360,971.
Patented Nov. 30, 1920.
3 SHEETS—SHEET 1.
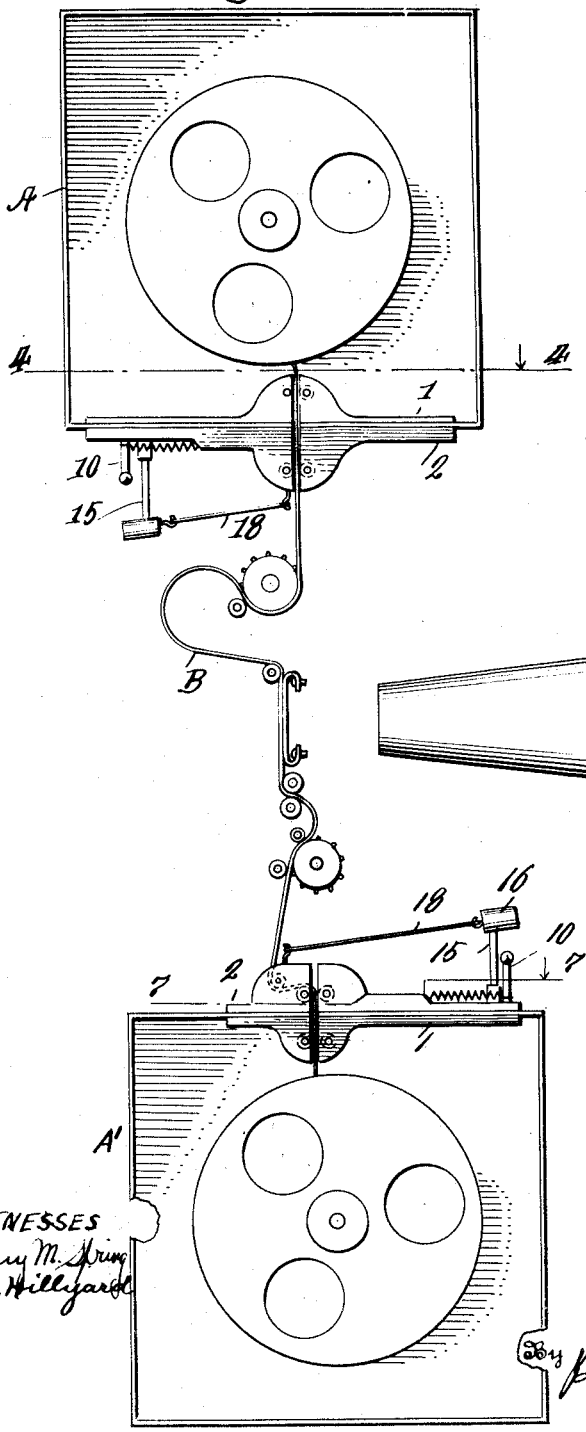
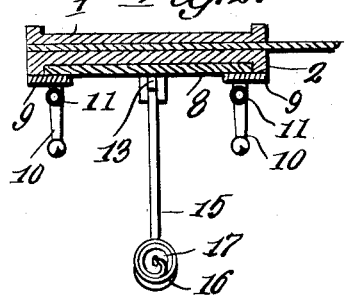
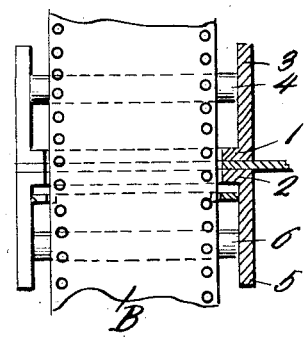
Inventor
Charles E. Morton

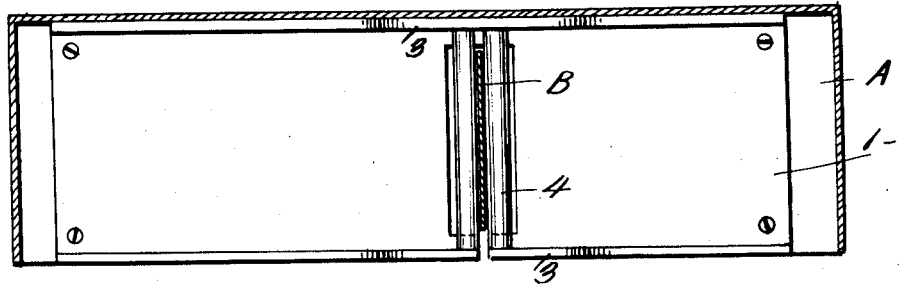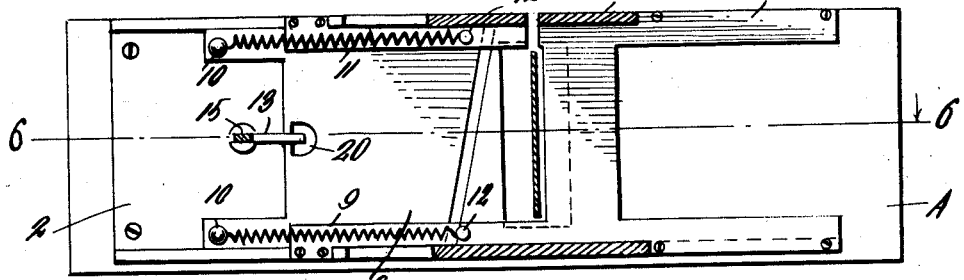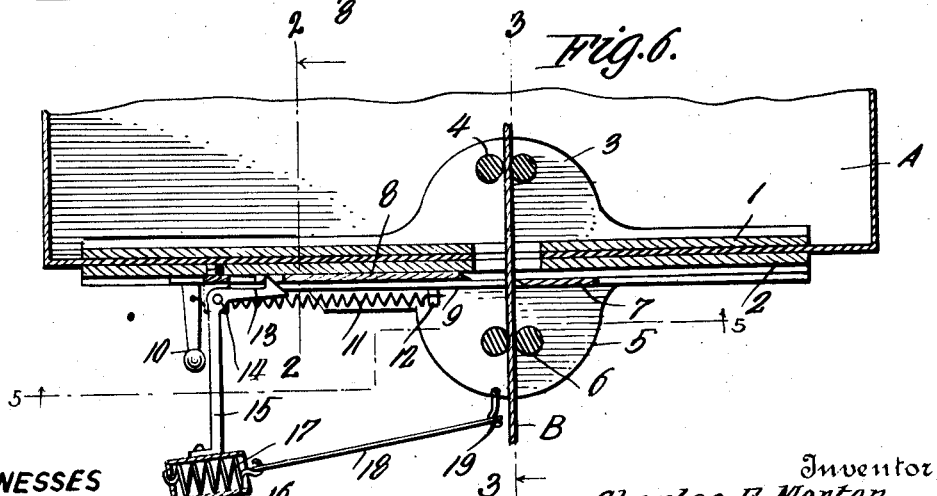

C. E. MORTON.
SAFETY MECHANISM FOR MOVING PICTURE MACHINES.
APPLICATION FILED APR. 23, 1919.
1,360,971.
Patented Nov. 30, 1920.
3 SHEETS—SHEET 3.
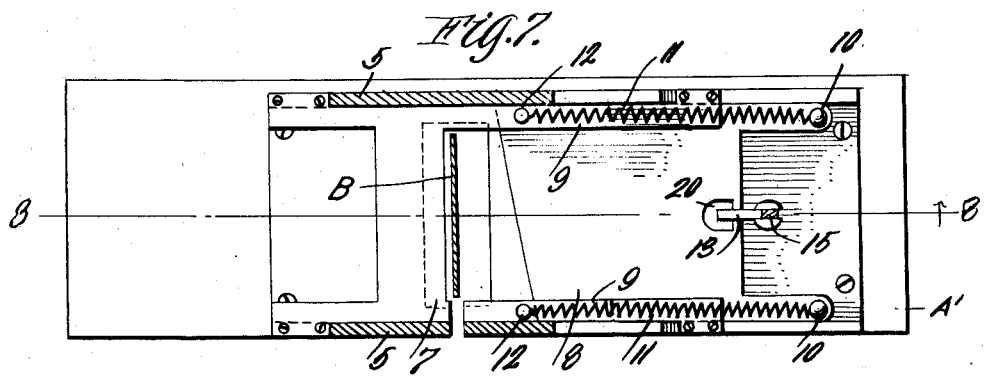
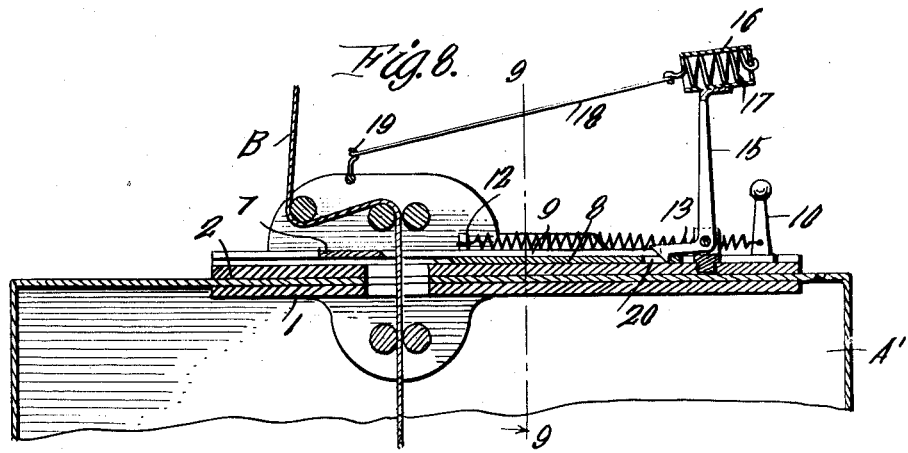
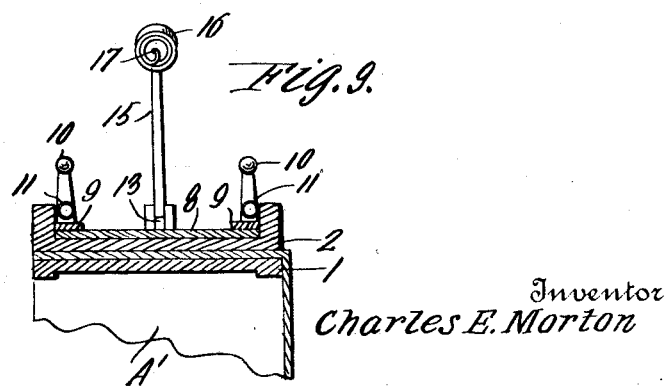
WITNESSES
Inventor
Charles E. Morton
By Richard B. Owen
Attorney

UNITED STATES PATENT OFFICE.

CHARLES E. MORTON, OF ST. LOUIS, MISSOURI.

SAFETY MECHANISM FOR MOVING-PICTURE MACHINES.

1,360,971. Specification of Letters Patent. Patented Nov. 30, 1920.

Application filed April 23, 1919. Serial No. 292,063.

*To all whom it may concern:*

Be it known that I, CHARLES E. MORTON, a citizen of the United States, residing in the city of St. Louis and State of Missouri, have invented certain new and useful Improvements in Safety Mechanism for Moving-Picture Machines, of which the following is a specification.

In moving picture mechanism and analogous means utilizing a combustible film, casualties frequently occur from such film being set on fire and it is the purpose of the present invention to prevent the spread of any fire to contigous portions of the film when the part exposed is ignited from any cause.

The film containing the matter to be reproduced is wound upon a reel and such reel is disposed in a magazine which is usually fire-proof. In the operation of the mechanism in reproducing the record on the film, the latter is unwound from the reel or spool upon which it is originally mounted and is rewound upon a reel or spool located in a second fire-proof magazine. The portion of the film intermediate the two magazines is susceptible to fire and by reason of the highly combustible character of the film such fire is quickly transmitted to that portion of the film contained in the magazine and frequently serious casualties occur.

The present invention has for its object to equip each of the magazines with safety means, whereby in an emergency such means are instantly and automatically brought into operation to sever that portion of the film exterior to the magazine and prevent fire being transmitted to the portion of the film contained within the magazine.

The drawings illustrate a preferred embodiment of the invention. However, it is to be understood that in adapting the same to meet different conditions, various changes in the form, proportion, and minor details of construction may be resorted to without departing from the nature of the invention as claimed hereinafter.

The accompanying drawings illustrate an adaptation of the invention to a moving picture mechanism and in said drawings;

Figure 1 is a diagrammatic view of relatively upper and lower magazines and intermediate film controlling mechanism showing the invention applied to each of the magazines.

Fig. 2 is a sectional detail of the safety mechanism on the line 2—2 of Fig. 6 looking to the left, as indicated by the arrow.

Fig. 3 is a sectional detail on the line 3—3 of Fig. 6.

Fig. 4 is a horizontal section on the line 4—4 of Fig. 1 showing the parts on a larger scale.

Fig. 5 is a section on the line 5—5 of Fig. 6 looking upward, as indicated by the arrows.

Fig. 6 is a longitudinal section on the line 6—6 of Fig. 5.

Fig. 7 is a horizontal section on the line 7—7 of Fig. 1 looking in the direction of the arrow and showing the parts on a larger scale.

Fig. 8 is a longitudinal section on the line 8—8 of Fig. 7.

Fig. 9 is a transverse section on the line 9—9 of Fig. 8, as designated by the arrow.

Corresponding and like parts are referred to in the following description and indicated in the several views of the drawings by like reference characters.

Inasmuch as the safety mechanism applied to the upper and lower magazines is substantially the same, a detailed description of one will suffice for a clear understanding thereof. The moving picture mechanism may be of any make or type and usually embodies an upper magazine A and a lower magazine A', the same being fire-proof and adapted to receive the reel or spool upon which the film B is wound. Each of the magazines is provided in a side with an opening for the passage of the film B. A frame is secured to the side of the magazine in which the film opening is formed. This frame comprises an inner plate 1 and an outer plate 2, said plates being secured upon opposite sides of the wall of the magazine in which the film opening is formed. The inner plate 1 is provided at opposite edges with extensions 3 between which a pair of guide rollers 4 is mounted. The outer plate 2 has corresponding extensions 5 between which a pair of guide rollers 6 is mounted. The pairs of guide rollers 4 and 6 are adapted to have the film B pass between them and are located in line with the film openings formed in the plates 1 and 2 and the wall of the magazine secured between such plates.

Cutting mechanism is mounted upon the outer plate 2 and comprises a fixed blade 7 and a movable blade 8, the latter having its cutting edge inclined to operate by a shear action. The movable blade 8 is disposed to operate in suitable guideways 9 provided at opposite edges of the plate 2. Posts 10 project outwardly from the blade 8 and contractile helical springs 11 connect such posts with pins 12 projecting outwardly from the guideways 9 or other convenient portion of the plate 2. The contractile springs 11 normally tend to project the movable blade 8 across the film opening of the plate 2 so as to close the same and coact with the fixed blade 7 to sever the projecting portion of the film exterior to the magazine and thereby prevent any fire being transmitted from the burning portion of the film to the interior of the magazine.

The blade 8 is normally held clear of the film openings by means of a detent 13 which is pivoted to the plate 2 at 14. An arm 15 projects outwardly from the pivot end of the detent 13 and is provided at its outer end with a casing 16 in which is located a contractile helical spring 17. A fuse 18 connects one end of the spring 17 with a hook 19 or like attaching element carried by the plate 2. The detent 13 is adapted to engage the opening 20 formed in the blade 8 so as to hold the same outward against the tension of the springs 11. In the event of fire the fuse 18 quickly melts and the reaction of the spring 17 operates the detent 13 to effect disengagement thereof from the blade 8 which is moved inwardly by the action of the springs 11 and in conjunction with the blade 7, severs the film and closes the film opening of the magazine, thereby preventing communication of fire to that portion of the film contained therein.

From the foregoing it will be understood that both magazines are equipped alike with safety mechanism, hence in the event of the exposed part of the film therebetween becoming ignited from any cause the fuses 18 will be quickly melted, thereby releasing the movable blades 8 from the restraining influence of the detents 13 whereupon the springs 11 will operate instantly to cut off the burning portion of the film and close the film opening of the magazines.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. In moving picture mechanism, a magazine provided in a side with a film opening, a fixed blade upon one side of the film opening, a movable blade upon the opposite side of the film opening, a spring coöperating with the movable blade and normally tending to project its cutting edge across the film opening to sever the film and close the said film opening, a detent for normally holding the movable blade clear of the film opening against the tension of the spring coöperating therewith, a fuse normally holding the detent in engagement with the movable blade and a spring in the length of the fuse to effect a rebound of the detent and cause positive disengagement thereof from the movable blade.

2. In moving picture mechanism, a magazine provided in a side with a film opening, a fixed blade upon one side of the film opening, a movable blade upon the opposite side of the film opening, a spring coöperating with the movable blade and normally tending to project its cutting edge across the film opening to sever the film and close the said film opening, a detent for normally holding the movable blade clear of the film opening against the tension of the spring coöperating therewith, an arm projecting from the detent, a casing carried by the arm, a contractile spring within the casing and a fuse connecting one end of the contractile spring with a part of the mechanism to normally hold the detent in engagement with the movable blade.

3. In moving picture mechanism comprising a magazine for receiving the film and having a film opening, a frame secured to the magazine and having a film opening in line with the film opening of the magazine, a fixed blade on the frame at one side of the film opening, a movable blade slidable on the frame and disposed upon the opposite side of the film opening, a spring normally tending to project the movable blade across the film opening, a detent engaging the movable blade to hold it against the action of the spring coöperating therewith, an arm projecting from the detent, a spring carried by said arm and a fuse connecting the spring with a part of the frame-work.

4. In moving picture mechanism, comprising a magazine for receiving the film and provided with a film opening, a frame comprising inner and outer plates secured upon opposite sides of the wall of the magazine in which the film opening is formed and having openings in register with the film opening of the magazine, inner and outer pairs of guide rollers mounted upon the respective plates in line with the film openings therein, a fixed blade secured to the outer plate at one side of the film opening, a movable blade slidable on the outer plate and arranged upon the opposite side of the film opening, a spring normally tending to project the movable blade across the film opening, a detent pivoted to the outer plate and engaging the movable blade, an arm projecting from the detent, a casing at the outer end of the arm, a contractile spring within the casing and a fuse connecting the contractile spring with a part of the mechanism.

In testimony whereof I affix my signature in presence of two witnesses.

CHARLES E. MORTON.

Witnesses:
HOBART H. NICKEL,
JOHN ADAMS.